US005564523A

United States Patent [19]
Howard

[11] Patent Number: 5,564,523
[45] Date of Patent: Oct. 15, 1996

[54] PORTABLE DEER STAND

[76] Inventor: Michael L. Howard, P.O. Box 337, Tipton, Mo. 65081

[21] Appl. No.: 405,819

[22] Filed: Mar. 17, 1995

[51] Int. Cl.$^6$ .................................................. E06C 5/00
[52] U.S. Cl. .................................. 182/63; 182/152
[58] Field of Search .......................... 182/116, 63, 152, 182/222, 151

[56]  References Cited

U.S. PATENT DOCUMENTS

| | | | |
|---|---|---|---|
| 999,126 | 7/1911 | Sistermann | 182/63 |
| 2,354,906 | 8/1944 | Bailey | 182/119 |
| 3,042,143 | 7/1962 | Siler | 182/163 |
| 3,485,320 | 12/1969 | Jones | 182/129 |
| 3,485,321 | 12/1969 | Smith, Jr. | 182/131 |
| 4,100,999 | 7/1978 | Conner | 182/122 |
| 4,552,247 | 11/1985 | Purdy | 182/116 |
| 4,784,239 | 11/1988 | Kirkman | 182/187 |
| 4,840,252 | 6/1989 | Hocks, Jr. | 182/187 |
| 4,886,139 | 12/1989 | Dupont et al. | 182/146 |
| 4,905,792 | 3/1990 | Wilson | 182/187 |
| 5,042,614 | 8/1991 | Rainey | 182/22 |
| 5,102,179 | 4/1992 | Royer | 182/63 X |
| 5,295,555 | 3/1994 | Strange | 182/116 X |

FOREIGN PATENT DOCUMENTS

| | | | |
|---|---|---|---|
| 762341 | 7/1967 | Canada | 182/178 |
| 3705566 | 9/1988 | Germany | 182/222 |
| 1321796 | 7/1987 | U.S.S.R. | 182/151 |

OTHER PUBLICATIONS

* Abstract From Official Gazette.

Primary Examiner—Alvin C. Chin-Shue
Attorney, Agent, or Firm—Richard L. Miller, P.E.

[57]  ABSTRACT

The invention is a portable, collapsible deer stand comprising a trailer, base, and stand structure. The stand structure comprises three stages, each stage comprising vertical braces, horizontal braces, and cross braces. The horizontal braces within a particular stage connect to each other at right angles and connect to the vertical braces also at right angles. The cross braces are affixed to and extend diagonally from the intersection of the horizontal braces and vertical braces, to an opposite intersection thereof. The cross braces have a hinge end and a fastening end, and a hinge secures the hinge end of the cross brace to the horizontal brace located above the cross brace. The cross brace is detachably secured at the fastening end to the horizontal brace in the stage below. To collapse the stand structure, the cross braces detach at the fastening end so that they may swing up, about the hinge to a position where parallel to and flush against the horizontal brace. Each vertical brace is of a slightly larger diameter than that of the vertical brace in the stage above it, so that upon collapsing the stand structure, the uppermost vertical brace may be inserted into the vertical brace below it, and those two may be inserted into the vertical brace in the stage below them, etc. When collapsed, the entire stand structure may be stored for easy transport in the base of the trailer.

8 Claims, 1 Drawing Sheet

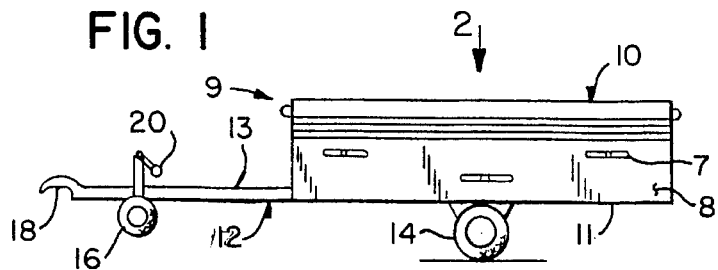
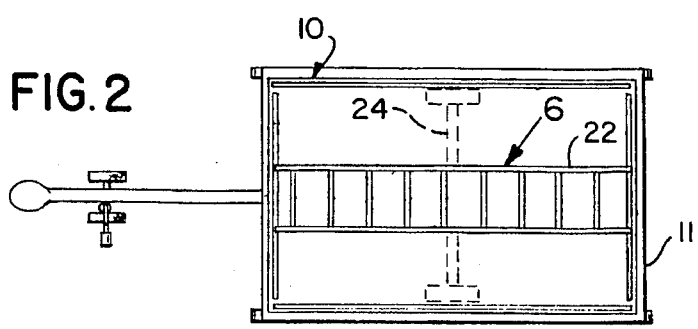
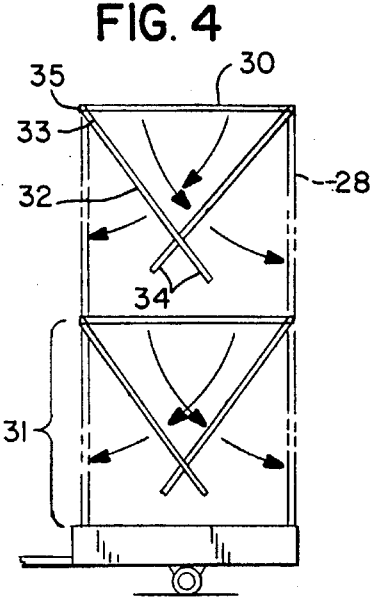
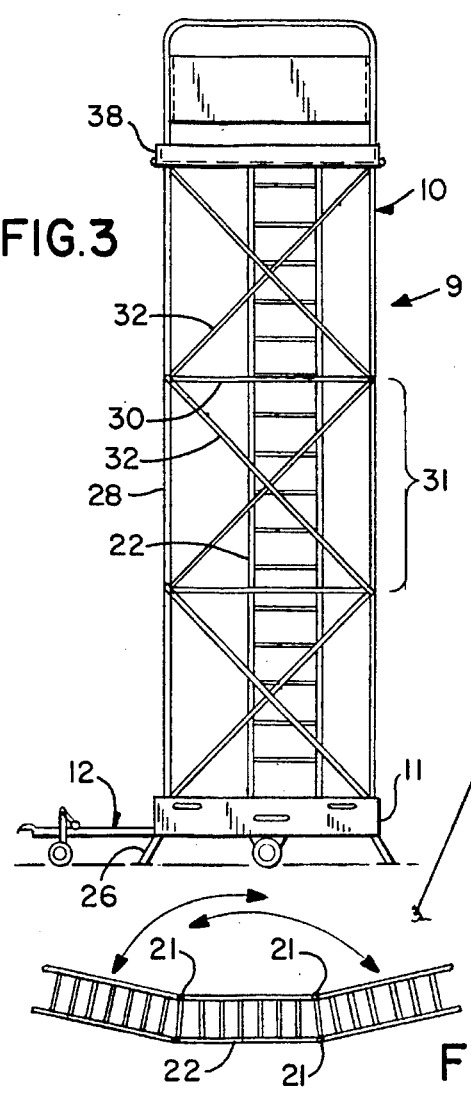
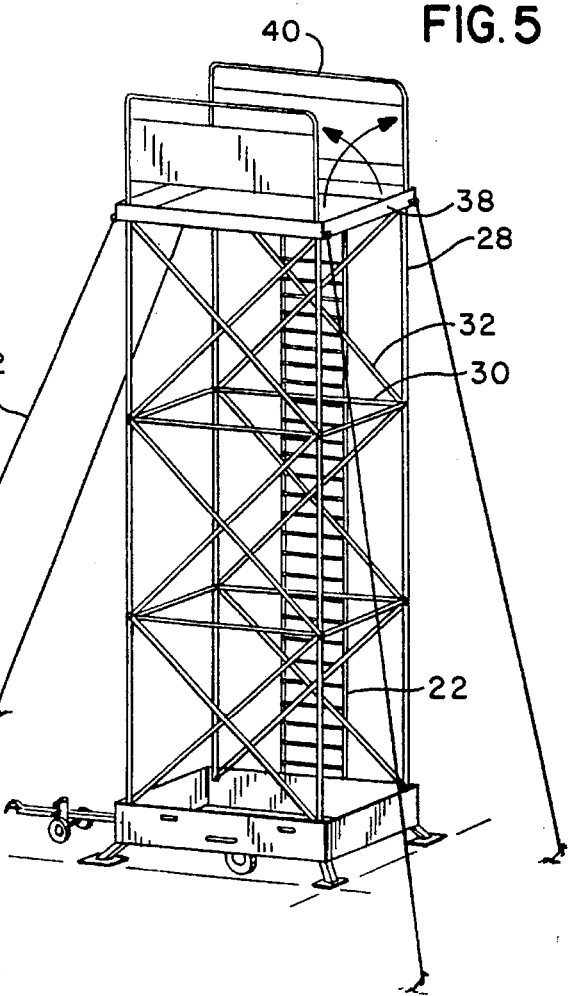

1

PORTABLE DEER STAND

BACKGROUND OF THE INVENTION

The invention relates to a portable deer stand. More particularly, the invention relates to a portable, compact collapsible structure capable of being transported into desired locations for the purpose of convenient hunting, bird-watching, photography and the like.

Elevated observational stands provide hunters, photographers and nature lovers secure seating and a wide visual range in fields and forested areas. Such devices tend to be of two types-those supported by the ground or another object, and those which are affixed to and supported from the upper trunk of a tree.

The relative ease of access to fields and forested areas by means of the increasingly popular "all terrain vehicle" (or ATV) has encouraged the development of elevated observational stands being used in conjunction with such ATV's. U.S. Pat. No. 5,042,614 to Rainey discloses an A-frame type hunting stand which is removably fixed to an ATV. An apparent shortcoming of such device is that it is transported about at its full height, thus potentially coming into unwanted contact with low branches and other potential obstructions common in thick wooded areas. While such device is capable of being disassembled or removed from the ATV for ground use, it is not capable of being collapsed into a smaller, self contained unit. Furthermore, such device can only be transported about by an ATV which is adapted to receive the A-frame base by means of base connector rods affixed to the ATV. If the A-frame device is removed from the ATV in the event that the ATV is needed for a task elsewhere, the A-frame unit is effectively immobilized, unless an identically adapted ATV is available for use. It would be impossible in this scenario to simply fasten the A-frame device to another generic ATV and transport it to the desired location.

U.S. Pat. No. 4,784,239 to Kirkman discloses a tree stand which is obviously not easily transportable, and which also requires substantial effort to set-up. Such device must be physically transported up a tree and then fastened to the tree trunk by means of flexible tie members. Accordingly, this device may be quite dangerous and fail to provide stable support for a hunter of photographer.

U.S. Pat. No. 4,886,139 to Dupont et al. discloses a power operated mobile scaffold. A substantial drawback of this device is that it is neither simple in design nor operation. Power devices are required to raise the scaffolding up or down in conjunction with complicated chain hoist mechanisms.

While these units may be suitable for the particular purpose employed, or for general use, they would not be as suitable for the purposes of the present invention as disclosed hereafter.

SUMMARY OF THE INVENTION

It is an object of the invention to produce a portable deer stand. It is another object of the invention to produce a portable device to be utilized for hunting, nature watching and the like, such device being compact and portable.

It is further object of the invention that such device be easily collapsible and provide sufficient height to the user so that the full expanse of the surrounding landscape is visible. Furthermore, it is an object of the invention to provide a safe, sturdy and secure vantage point for such viewing.

It is a still further object of the invention to provide a portable stand which can be self-supporting or supported by the ground, and can be easily removed from its trailer if so needed.

The invention is a portable, collapsible deer stand comprising a trailer, base, and stand structure. The stand structure comprises three stages, each stage comprising vertical braces, horizontal braces, and cross braces. The horizontal braces within a particular stage connect at right angles, and the cross braces are affixed to and extend diagonally from the intersection of the horizontal braces and vertical braces, to an opposite intersection thereof. The cross braces have a hinge end and a fastening end, and a hinge secures the hinge end of the cross brace to the horizontal brace located above said cross brace. The cross brace is detachably secured at the fastening end to the horizontal brace in the stage below. To collapse the stand structure, the cross braces detach at the fastening end so that they may swing up, about the hinge to a position where the cross braces are parallel to and flush against said horizontal brace. Each vertical brace is of a slightly larger diameter than that of the vertical brace in the stage above it, so that upon collapsing the stand structure, the uppermost vertical brace may be inserted into the vertical brace below it, and those two may be inserted into the vertical brace in the stage below them, etc. When collapsed, the entire stand structure may be stored for easy transport in the base of the trailer.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a diagrammatic side elevational view of the instant invention in a collapsed state ready to be transported;

FIG. 2 is a diagrammatic top plan view taken in the direction of arrow 2 in FIG. 1;

FIG. 3 is a diagrammatic side elevational view taken in the direction of arrow 3 in FIG. 2 but with the stand fully erected and ready for use;

FIG. 4 is a diagrammatic partial view illustrating the erecting of the stand;

FIG. 5 is a diagrammatic perspective view of the fully erected stand with steadying guide wires installed thereon; and FIG. 6 is a diagrammatic view illustrating the unfolding of a sectional ladder indicated by arrow 6 in FIG. 2.

DETAILED DESCRIPTION OF THE PREFERRED EMBODIMENTS

FIG. 1 illustrates a deer stand 9, with the stand structure 10 in a collapsed state. The stand structure 10 is affixed to a typical trailer 12, said trailer having a base 11, which is essentially rectangular in shape, having side walls 8. The side walls 8 have safety reflectors 7 affixed thereon. The trailer 12 also has a trailer arm 13, rear wheels 14 and front wheels 16. The front wheels 16 are secured to the trailer arm 13. The trailer arm 13 also has a ball-hitch receptacle 18, for receiving standard automotive ball-hitches. A trailer crank 20 is joined to the front wheels 16, so that the trailer arm 13 and hence ball-hitch receptacle 18 may be raised and lowered in order to facilitate fastening the trailer 12 in a typical manner to a ball-hitch equipped car, camper or ATV.

FIG. 2 shows a collapsible ladder 22 in a collapsed state, stored on top of the stand structure 10 which is also in a collapsed state. The collapsible ladder 22 comprises three sections of equal length, said sections affixed to each other by means of a hinge 21 such that the collapsible ladder 22 may be folded up for convenient storage. Both the collapsible ladder 22 and the stand structure 10 are shown contained within the base 11 of the deer stand 9. A rear wheel axle 24, upon which the rear wheels 14 are mounted, is also shown.

FIG. 3 shows the stand structure 10 fully erected. It can be seen that the stand structure 10 is affixed to the trailer 12, and more specifically to the base 11 of the trailer 12. The trailer 12 has bracing legs 26 which store underneath the base 11, and which are unfolded to a position where they are in contact with the ground beneath the trailer 12, so as to provide extra stability when the stand structure 10 is in the fully erected position. The stand structure 10 has three stages 31, each stage 31 comprising vertical braces 28, horizontal braces 30 and cross braces 32.

By referring to FIG. 4, it can be seen that the horizontal braces 30 within a particular stage 31 connect at right angles, forming a rectangle of horizontal braces 30 which has a plane substantially parallel to the horizon. Each rectangular connection of horizontal braces 30 in a stage 31 is fastened to a similar rectangular connection of horizontal braces 30 in a stage 31 below by means of the vertical braces 28 and the cross braces 32. The vertical braces 28 are fastened to and extend at right angles from each corner of the rectangular connection of horizontal braces 30, downward, to the corner of the rectangular connection of horizontal braces 30 located immediately beneath it, where it is also fastened at a right angle. The cross braces 32 are affixed to and extend diagonally from the intersection of the horizontal braces 30 and vertical braces 28, to an opposite intersection thereof.

The cross braces 32 have a hinge end 33 and a fastening end 34. A hinge 35 secures the hinge end 33 of the cross brace 32 to the horizontal brace 30 located above said cross brace 32 at the location where the horizontal brace intersects with the vertical brace. The cross brace 32 is detachably secured at the fastening end 34 to the horizontal brace 30 in the stage 31 below at the location where the horizontal brace 30 intersects with the vertical brace 28. To collapse the stand structure 10, the cross braces 32 detach at the fastening end 34 so that they may swing up, about the hinge 35 to a position where the cross braces 32 are parallel to and flush against said horizontal brace 30.

The vertical braces 28 are telescoping in that each vertical brace 28 is of a slightly larger diameter than that of the vertical brace 28 in the stage 31 above it, so that upon collapsing the stand structure 10, the uppermost vertical brace 28 may be inserted into the vertical brace 28 below it, and those two may be inserted into the vertical brace 28 in the stage below them, etc. Accordingly, to erect the stand structure 10, as indicated in FIG. 4, the first set of horizontal braces 30 must be lifted upward so that the first set of vertical braces 28 slide out from the vertical braces 28 below them within which they were stored in the collapsed state. Furthermore, the cross braces 32 which are parallel to and flush against the horizontal braces 30 must be swung down so that the fastening end 34 of the cross brace 32 contacts the intersection of the vertical brace 28 and horizontal brace 30 below it, where it may then be fastened by means of a clamp, bolt, pin, or the like.

After performing this task on each set of cross braces 28, the stand structure 10 will be fully erected, as seen in FIG. 5. A platform 38 is located at the top of the erected stand structure 10, to provide a safe and comfortable area for hunters, photographers and the like to gain an optimal vantage point. Guide rails 40 are affixed to the platform 38, said guide rails 40 extending up at right angles from the platform 38. Said guide rails 40 are pivotally attached to the platform 38, such that said guide rails 40 may be folded down on top of the platform 38 to a position where they are substantially parallel to the platform 38 when collapsing the stand structure 10 for storage in the base 11.

As seen in FIG. 6, the final step in erecting the stand structure 10 comprises unfolding the collapsible ladder 22, which was stored on top of the collapsed stand structure 10 seen in FIG. 2, and then securing it to the erected stand structure 10 as seen in FIGS. 3 and 5. Once unfolded, the collapsible ladder 22 may be detachably secured to the erected stand structure 10 by clamps, pins, bolts, etc. Finally, support lines 42 are fastened to each corner of the platform 38, and then secured to the ground by means of stakes or the like, providing extra rigidity to the stand structure 10.

What is claimed is:

1. A portable deer stand, comprising:
   a) a trailer;
   b) a base, said base affixed to the trailer;
   c) a stand structure, said stand structure affixed to the base, and said stand structure comprising
      i) two or more stages, each stage comprising vertical braces, horizontal braces, and cross braces, the horizontal braces connecting at right angles, forming a rectangular connection of horizontal braces which has a plane substantially parallel to the horizon, each rectangular connection of horizontal braces in a stage being fastened to a similar rectangular connection of horizontal braces in a stage below by means of the vertical braces and the cross braces, the vertical braces fastened to and extending at right angles from each corner of the rectangular connection of horizontal braces, downward, to the corner of the rectangular connection of horizontal braces located immediately below it, where they are also fastened at right angle angles, the cross braces affixed to and extending diagonally from the intersection of the horizontal braces and vertical braces, to an opposite intersection thereof, the cross braces have a hinge end, a fastening end, and a hinge, the hinge securing the hinge end of the cross brace to the horizontal brace located above the cross brace at the location where the horizontal brace intersects with the vertical brace, the cross braces detachably secured at the fastening end to the horizontal brace in the stage below also at the location where the horizontal brace intersects with the vertical brace, so that the cross brace may swing up, about the hinge, to a position parallel to and flush against the horizontal brace above it, the vertical braces of one stage of the stand structure are of a slightly larger diameter than that of the vertical braces in the stage above it, so that when the fastening end of the cross braces are detached from the horizontal braces in the stage below and swung up, about the hinges, to a position parallel to and flush against the horizontal braces above it, the uppermost vertical braces may be telescopically inserted into the vertical braces in the stage inserted into the vertical braces in the stage below it, and those two may be telescopically below them, thus allowing the stand structure to completely collapse, in a telescoping manner, for convenient storage in the base;

ii) a platform, said platform affixed to the top of the uppermost stage of the stand structure; and d) a collapsible ladder.

2. The apparatus as recited in claim 1, wherein the collapsible ladder comprises three sections of equal length, said sections affixed to each other by means of a hinge, such that the collapsible ladder may be folded up and placed on top of the collapsed stand structure for easy storage and transport when said stand structure is stored in the base of the deer stand.

3. The apparatus as recited in claim 2, wherein guide rails are affixed to the platform, said guide rails extending up at right angles from the platform, said guide rails further being pivotally attached to the platform, such that said guide rails may be folded down on top of the platform to a position where they are substantially parallel to the platform when collapsing the stand structure for storage in the base.

4. The apparatus as recited in claim 3, wherein the trailer has bracing legs which store underneath the base and which are unfolded to a position where they are in contact with the ground beneath the trailer so as to provide extra stability when the stand structure is in the fully erected position.

5. The apparatus as recited in claim 4, wherein support lines are fastened to each corner of the platform and then secured to the ground, thus providing extra rigidity to the stand structure when in the fully erected position.

6. The apparatus as recited in claim 5, wherein the trailer has rear wheels, front wheels, and a ball-hitch receptacle, so that the trailer, base, and stand structure may be easily hitched to and transported by a car, ATV, or other vehicle.

7. The apparatus as recited in claim 6, wherein the stand structure comprises three stages.

8. A method for collapsing a portable deer stand, said portable deer stand comprising a trailer, base, and stand structure, said stand structure comprising stages and having a platform with pivotally affixed guide rails fastened to an upper-most stage, each stage comprising vertical braces, horizontal braces, and cross braces, the horizontal braces connecting at right angles and forming a rectangular connection of horizontal braces which has a plane substantially parallel to the horizon, each rectangular connection of horizontal braces in a stage being fastened to a similar rectangular connection of horizontal braces in a stage below by means of the vertical braces and the cross braces, the vertical braces fastened to and extending at right angles from each corner of the rectangular connection of horizontal braces, downward, to the corner of the rectangular connection of horizontal braces located immediately below it where they are fastened at right angle angles, the cross braces affixed to and extending diagonally from the intersection of the horizontal braces and vertical braces, to an opposite intersection thereof, the cross braces also having a hinge end, a fastening end, and a hinge, the hinge securing the hinge end of the cross brace to the horizontal brace located above the cross brace, the cross braces detachably secured at the fastening end to the horizontal brace in the stage below, and the vertical braces of one stage of the stand structure being of a slightly larger diameter than that of the vertical braces in the stage above it, comprising:

a) detaching the cross braces at the fastening end, and swinging them up, about the hinge to a position substantially parallel to the horizontal brace located immediately above said cross brace;

b) inserting the uppermost vertical braces into the vertical braces in the stage below, and then inserting those braces into the vertical braces in the stage below them, thus allowing the stand structure to collapse in a telescoping manner;

c) folding the guide rails, which are pivotally attached to the platform, from a position where said guide rails extend at a right angle from the plane of said platform, to a position where said guide rails are substantially parallel to the plane of said platform; and d) pulling the stand structure downward, thus collapsing it for storage within the base.

* * * * *